Patented Nov. 10, 1931

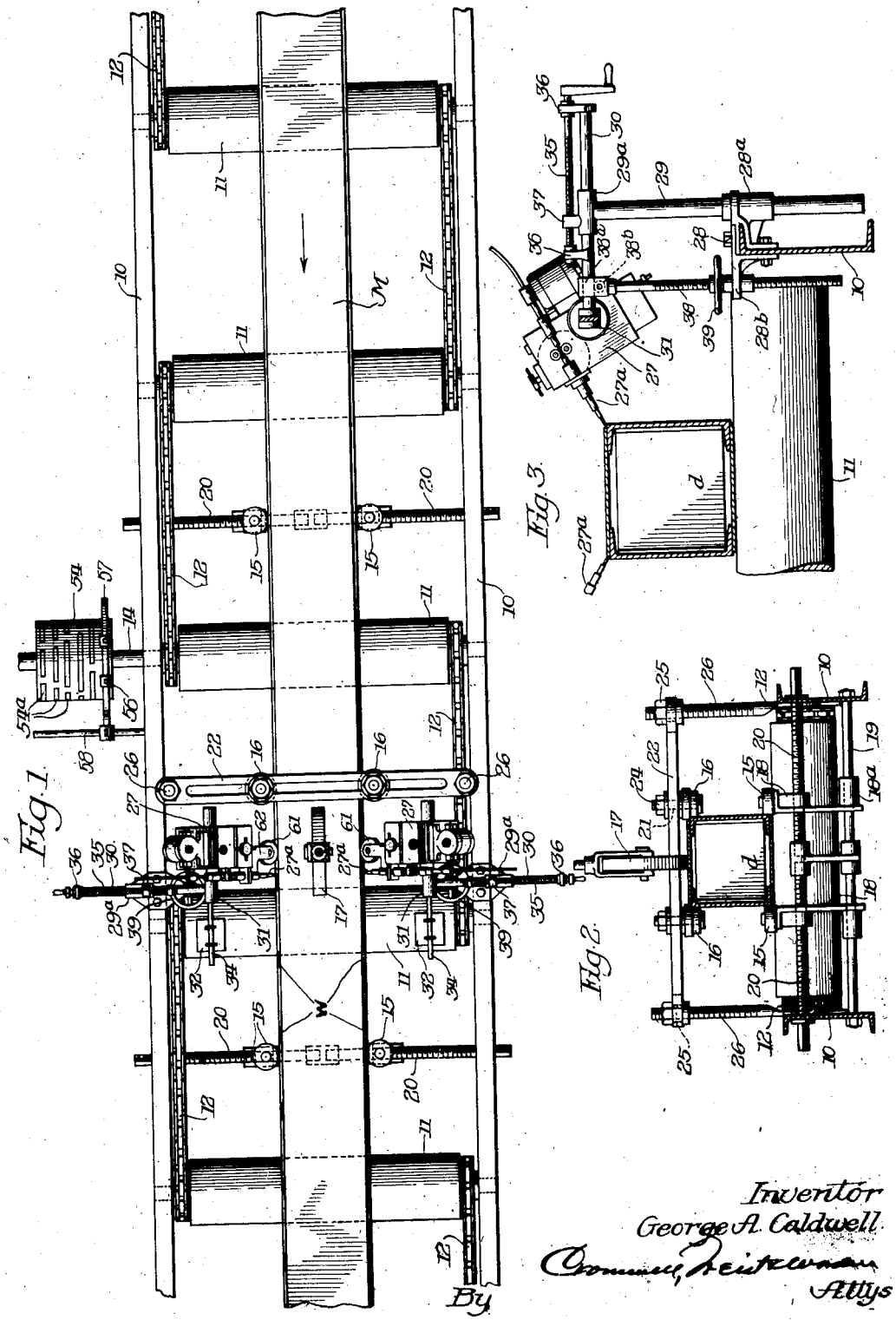

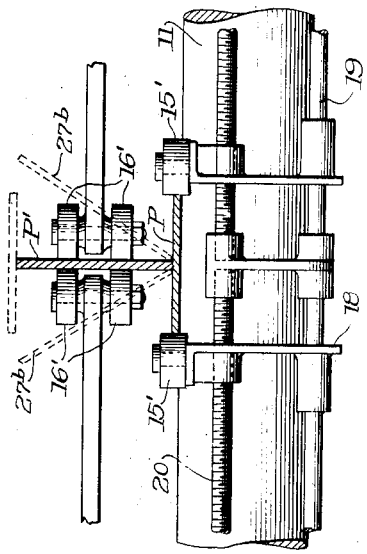
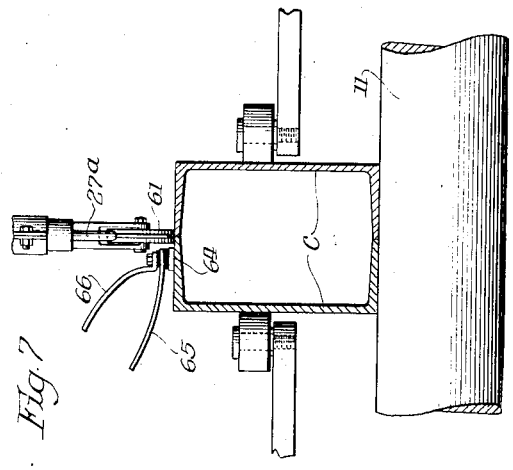
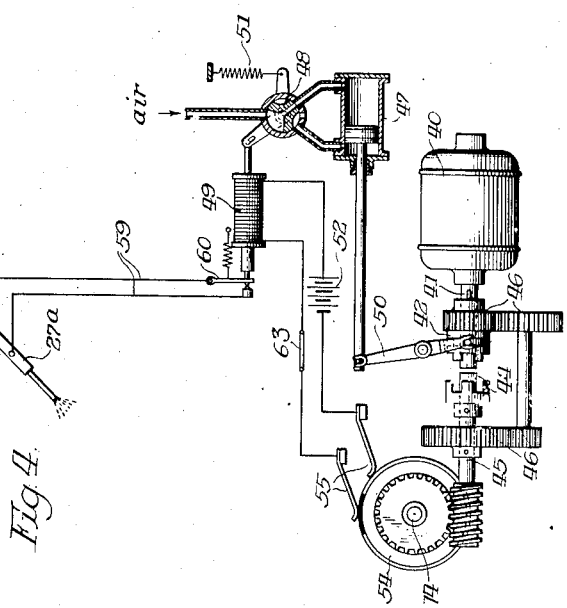
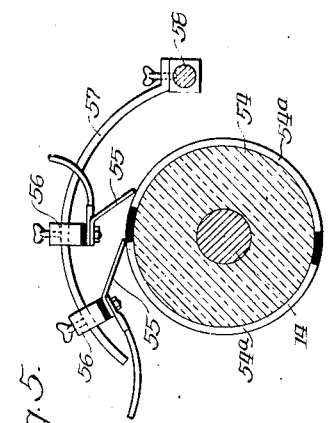

1,831,343

UNITED STATES PATENT OFFICE

GEORGE A. CALDWELL, OF DECATUR, ILLINOIS

METHOD AND APPARATUS FOR WELDING STRUCTURAL MEMBERS

Application filed May 5, 1927. Serial No. 188,881.

This invention relates to method and apparatus for the welding of heavy metallic members, such as rolled commercial shapes to form fabricated structural members and the like.

The general object of the invention is the provision of a method and apparatus whereby commercial shapes may be united by welding to form structural members or the like of various forms and construction suitable for use in building frame structures and the like.

One of the particular objects of the invention is the provision of such a method and apparatus whereby the component pieces of a composite structural member may be united in a secure and accurate manner by electric welding, with such rapidity and elimination of labor as to afford an economical manufacturing practice.

Another object is the provision of apparatus whereby the manufacture of structural members may be carried on automatically and with speed and accuracy, with the utilization of electric arc welding.

Another object is the provision of automatic apparatus having the characteristics just mentioned and which is adapted for the manufacture of structural members of various forms and sizes.

Another object is the provision of such apparatus which will be certain and simple in operation and control.

Still another object is the provision of such apparatus adapted to make either continuous or interrupted welds.

A further object is the provision of such apparatus by which the extent of the welds may be definitely controlled.

Other and further objects will be pointed out or indicated hereinafter, or will be apparent to one skilled in the art upon an understanding of the present invention or its employment in practice.

In the accompanying drawings forming a part of this specification, I illustrate in diagrammatic fashion one form of apparatus in which the invention may be embodied and practiced, together with various details or features thereof, but it is to be understood that this is presented for purpose of illustration only and is not to be accorded any interpretation having the effect of limiting the claims short of the true and most comprehensive scope of the invention in the art.

In the drawings,

Fig. 1 is a top or plan view of a portion of an automatic welding machine, portions of the driving and control mechanism being omitted;

Fig. 2 is a sectional elevation taken transversely of the machine and illustrating certain portions of the guiding mechanism;

Fig. 3 is a detail in the nature of a side elevation of means for supporting and adjusting a welding head in relationship to the work upon which it operates;

Fig. 4 is a schematic illustration of driving and control means for regulating the feed of the work and the operation of the welding apparatus;

Fig. 5 is a detail in the nature of a sectional elevation of the control switching mechanism;

Fig. 6 is a detail in the nature of a part transverse sectional elevation of work feeding and guiding portions of the machine; and Fig. 7 is a similar detail illustrating the relationship of the weld forming elements to one particular piece of work.

In the fabrication of steel, and the like, as for the construction of structural members for building frames, it has been customary heretofore to connect the component pieces by riveting. Various forms of shop machinery have been devised for carrying on the various operations, such as the punching and riveting, in an automatic or semi-automatic manner, with the object of increasing production and reducing manufacturing costs. Various advantages may be gained by the employment of electric welding in the fabrication of such members, as certain handling operations may be eliminated and various types of members may be built which cannot be constructed by riveting. The present invention provides a method and an apparatus whereby electric welding may be utilized in the manufacture of such structural members to effect quantity production rapidly and economically and with great reduction of labor costs.

Described generally, the invention contemplates the feeding of the several pieces, which are to be united to form a structural member of the desired construction, to an electric arc welding apparatus of known or suitable type, in an assembled relationship corresponding to that in which they are to be connected, and welding the several pieces together at selected places or in a selected manner, the welding operation and the work feeding and guiding operations being so controlled and co-ordinated as to produce good welds in the desired locations without distortion of the members. Moreover, the feeding of the work and the operation of the welding apparatus are so coordinated and controlled as to maintain a proper rate of feed while a weld is being formed and to obtain an increased rate of feed for moving the work from one welding position to another.

The nature of the invention will be understood more fully by reference to the illustrative mechanism shown in the drawings. In the partial plan view shown in Fig. 1, the reference numeral 10 designates side frame members which carry the work feeding apparatus. The latter includes the rollers 11, which are journalled in the side frame members, and transmission means 12 whereby the rollers are connected and operated for rotation at the same peripheral speed, the power being applied through a drive shaft 14 which is driven by a motor or other suitable prime mover. The rollers 11 are mounted with their surfaces tangent to a common plane, and constitute supporting members, as well as feeding members, for the work, which is designated in Fig. 1 by the reference character M. Work guiding means is provided, that here illustrated comprising cooperating sets of rollers which are held in fixed positions with respect to the frame for rolling contact with various portions of the work. As illustrated in Figs. 1 and 2, the work guiding means comprises lower rollers 15 and upper rollers 16, and a holding down roller 17. Each of the rollers 15 is journaled on an adjustable bracket 18 which is shiftable transversely of the machine frame, being guided at its lower end by a rod 19 which passes through a sleeve 18ª of the bracket, and having screw thread engagement with an adjusting screw 20 which may be engaged by a crank at its outer end to be rotated, thus to shift the bracket either inwardly or outwardly. The rollers 15 are thus adjustable in position to give them the proper cooperative engagement with opposite sides of the work. The upper rollers 16 are likewise adjustable transversely of the machine, as they are mounted on spindle members 21 which are supported on the slotted bar 22, to which they may be clamped at selected positions by setting up the nuts 24. The rollers 16 are also adjustable vertically, the bar 22 being carried on nuts 25 which are threaded on the upright post screws 26 mounted on the side frame members 10. The guide rollers may be exchangeable, so that rollers appropriately formed for cooperation with work of different shapes may be fitted as desired. The guide rollers are arranged in association with the welding apparatus, which is of the arc type, the welding heads being designated generally by the reference character 27. The welding heads are adjustably mounted in association with the machine, so that they may be brought into the proper operative relation to work of different sizes and shapes. In the form of adjustable mounting illustrated in Fig. 3, a bracket 28 is mounted on the side frame member, which bracket carries a guide sleeve 28ª in which is slidably mounted a post 29. This post carries a sleeve 29ª at its upper end, in which is carried a slidable member 30. The welding head 27 has swivel connection with the inner end of the adjustable arm 30 by a connection 31 which permits the head a rotatable movement about the axis of the member 30 and also a rotatable movement on an axis at right angles thereto. A counterbalancing weight 32 supported on an arm 34 extending from the swivel connection 31, is arranged to counterbalance the weight of the head 27. An adjusting screw 35 is journaled in bearing members 36 connected to the adjustable arm 30, and has thread engagement in a tapped lug 37 fixed to the sleeve 29ª. By operation of the screw 35, therefore, the adjusting arm 30 may be moved inwardly or outwardly with respect to the machine frame, to position the welding head. The vertical adjustment of the welding head is controlled by a screw 38 which carries at its upper end a guide 38ª and a roller 38ᵇ on which the adjusting arm 30 travels. The screw 38 may be raised and lowered by operation of a wheel nut 39 which bears on a bracket portion 28ᵇ in which the screw 39 is guided. The welding head is supplied with operating current and with the fusible electrode wire in customary manner and operates in the usual fashion. Its operation, however, is subject to automatic control, whereby it is coordinated with the work feeding mechanism.

In Fig. 4 is illustrated in schematic fashion the driving mechanism for the work feed and the control mechanism for same and for the welding apparatus. The driving motor 40 is operably connected with the drive shaft 14 through a clutch and change-speed gearing. The motor shaft 41 carries a shiftable clutch member 42 adapted for engagement with a cooperating clutch member 44 to make direct driving connection between the motor and the worm shaft 45, to drive the shaft 14 at a speed suitable for shifting the work from one welding position to another. By means of reduction gearing 46, the motor shaft may be coupled to the worm shaft 45, when the clutch is disengaged, to drive the shaft 14 at a reduced speed, suitable for the feed of the work during the time a weld is being made. Automatic mechanism is provided for controlling the change from one speed to the other. This includes the gear shifting motor 47, here illustrated as a pneumatic motor, to which supply of the actuating pressure fluid is controlled by valve 48. This valve is operated, for shifting from one position to the other, by a solenoid 49. Thus, when the valve 48 is shifted to the position shown in Fig. 4, the air is admitted behind the piston of motor 47, so that the same is moved forwardly to operate the clutch lever 50 to disengage the clutch and engage the speed reducing gearing 46. When the valve 48 is shifted to the opposite position, the air is admitted in front of the motor piston and the latter moved rearwardly to disengage the speed reducing gearing and throw in the clutch. The valve 48 is shifted in one direction by a spring 51, and in the other direction by the solenoid 49 when the latter is energized from the source 52. The energization of the solenoid is controlled by a rotating switch device 54 which rotates with the shaft 14. This switch is in the nature of a commutator drum having different peripheral series of contact segments 54ª arranged thereon, the respective segments being insulated from one another, together with brushes 55 adjustably mounted for cooperation with the contact segments. Each of the brushes is carried on a holder 56 which is adjustably supported on an arm 57, so that they may be adjusted to different relative positions in directions circumferentially of the drum 54. The arm 57 is mounted on a rod 58, on which it is adjustable in directions axially of the drum. The contact segments 54ª in respective circumferential series are of uniform length, but those in one series are of different length than those in another, and the arrangement of the brushes 55 is such that both track on the same series of segments, the particular series depending on the particular position of the arm 47 on rod 48. When the brushes are placed in electrical connection by one of the segments, the circuit is closed through the solenoid 49, and the latter energized to shift the valve 48 against the influence of springs 51, thus, in the arrangement illustrated in Fig. 4, to throw in the clutch and cause shaft 14 to be driven at the higher speed. When the solenoid circuit is opened, however, by one of the brushes being on an insulating gap between segments, the solenoid is deenergized and the valve 48 moved by spring 51 to the position shown, whereby the clutch is disengaged and the speed reducing gearing engaged, so that shaft 14 is driven at its lower speed. The controlling circuit of the welding apparatus is indicated in part at 59, and this circuit is opened and closed by a switch 60, depending on the position of the solenoid core. When the solenoid is energized, and the work feeding mechanism of the machine is operating at the higher speed, the switch 60 will be open, and the welding apparatus will be inactive. When the solenoid is deenergized, and the work feed operating at the lower speed, the switch 60 will be closed and the welding apparatus in operation. Thus, the operation of the welding apparatus is coordinated with the work feeding mechanism in such fashion that when the work is being shifted from one welding position to another, the welding apparatus will be inactive, and during the time that a weld is being made the work will be fed at a reduced speed appropriate for the forming of a suitable weld.

This control of the work feeding speed and the welding apparatus is of particular importance in respect to rapid production, as by the employment of an increased speed for shifting the work from one welding position to another, the total time required for passing a given piece of work through the machine is very much less than would be required if it were fed continuously at the rate permitted by the weld-forming operations. It is likewise of great importance in the employment of "stitch" welding for connecting the component members of a piece of work. I employ this term to designate a construction wherein the members are connected by a number of welds which are spaced apart along the line of the joint or connection. By employment of this construction, the parts may be joined to form a structural member of the desired strength and stiffness, at much less cost than if the parts were connected by continuous welds. In a machine employing the features above described, the length of the welds, as well as their spacing from one another, may be accurately controlled in an automatic fashion. By adjustment of the brushes 55 toward and from each other, the length of the welds may be predetermined, as the closer together the brushes are, the shorter will be the period that the solenoid circuit is open and the low-speed driving connection and welding apparatus in operation. If a continuous weld is to be formed, the solenoid circuit is opened by a switch 63 during the time that the work is being fed past the welding apparatus. The spacing of the welds is predetermined in part by the spacing of the brushes and in part by the length of the commutator segments. As stated above, the length of the segments 54ª is different in the different circumferential series. Thus, in one series there may be two segments, as illustrated in Fig. 5, in another series three, in another series four, and so on. Since the distance that the work is fed between welds depends upon the distance that shaft 14 rotates while the brushes are electrically connected by a segment, it follows that the spacing of the welds may be predetermined by adjustment of arm 57 to the position wherein the brushes track on the series of segments of the selected length. The spacing depends also to a certain extent upon the length of the welds, as determined by the relative positions of the brushes, as above described. With a given adjustment of the brushes, therefore, both the length of the welds and the spacing of the welds are maintained uniform automatically.

The welding apparatus may comprise a single welding head or a plurality of welding heads, all controlled in operation by means and in the manner as above described. In the arrangement illustrated in Fig. 1, there are two welding heads, arranged to operate simultaneously on opposite lateral portions of the work. The use of a plurality of welding heads, of course, speeds up the production, as thereby a plurality of welds may be made simultaneously. In some forms of work, it is of advantage to form the welds simultaneously at directly opposite sides of the member. For example, in Figs. 1 and 3 the member M is being formed out of a pair of oppositely arranged channels with connecting plates applied over their flanges. By making the welds W simultaneously at approximately opposite points on the margins of the connecting plate, the heating effects on the plate are symmetrical, so that the warping of the plate out of alignment by thermal expansion is avoided. However, the welding heads may be arranged in offset relationship longitudinally of the machine, so that the welds will be formed at opposite sides of the work in staggered relationship. It was pointed out above that the welding heads are flexibly mounted so that they may have a swivel movement in certain directions. This mounting is such that their weight tends to move their electrode holders 27$^a$ toward the work. As a means for accurately controlling the point of application of the welding arc to the work incident to the feeding movement of the latter, I provide tracker rollers 61 which are journalled in clamps 62 secured to the electrode holders so that the rollers are maintained in alignment therewith on the side from which the work approaches. These rollers are arranged to ride on the work, being held against same by the weight of the welding head, and to find guidance against surfaces thereof in the line of the weld, as in the reentrant angle between two portions which are to be connected. These rollers preserve the proper spacing of the electrode holder from the work to maintain the welding arc, and they also guide the electrode with respect to the work, along the line on which the weld is formed, so as to accommodate its position to variations in the alignment of the work.

In Fig. 6 is illustrated a set-up for the connection of two plates in perpendicular relationship. The plate P, which may be intended to form the flange members of a plate girder, is supported on the feed rollers 11 and guided laterally by the rollers 15′, and the plate P′, which may be intended to form the web member of the girder, is disposed on edge in perpendicular relationship to plate P and maintained in the proper position and relationship by the lateral guide rollers 16′. The dotted lines 27$^b$ indicate the relationship in which the welding electrode is fed and the arc applied for forming welds connecting the two plates.

In Fig. 7 is illustrated a set-up for forming a box girder from a pair of channel members by welding their flanges in abutting relationship. The two channel members C are here arranged side by side on the feed rollers 11, with the margins of their flanges in abutment, and the welds are formed along the line of contact, the electrode here being presented to the work in a vertical position. In the forming of this and similar types, I have ascertained that magnetic and eddy current effects are likely to produce fields of force which tend to deflect the arc from the desired point of application, and cause uneven melting of the fusible electrode. I avoid these effects by positioning the ground electrode quite close to the line of the weld, as in the fashion illustrated in Fig. 7. Here the ground electrode 64 is shown in the form of a copper bar which rides on a surface of the work adjacent the line of the weld, being maintained thereon in proper relationship to the fusible electrode by a holding spring 65, insulated from the electrode so as to maintain its temper, the current being taken off on a suitable conductor 66. In various other arrangements the ground current may be taken off through the holding-down roller.

As mentioned above, the exchangeable guide rollers may be formed in various fashions, such as best calculated to exercise their intended functions and may, with advantage, be arranged for cooperation with a plurality of the component pieces of the work. The rollers 16, as shown in Fig. 2, are formed for guiding cooperation with the channel members and the upper plate member of the box girder, so that they not only guide the assembly as a whole into proper relationship with the welding apparatus, but also maintain the component pieces in the desired relative positions in which they are to be connected.

While the operation of the various portions of the machine has been explained in detail above, I will now give a general explanation of the operation of the machine, and incidentally an explanation of my improved method of forming structural members, which may be carried out by the machine. The component pieces, such as rolled commercial shapes, which are to be connected to form a desired structural member, are assembled in the desired relationship, and placed upon the feed rollers 11. In some instances, it may be desirable to connect certain of the pieces by preliminary or temporary spacers or the like such as the diaphragm $d$ shown in Figs. 2 and 3. The various guide rollers are adjusted to the proper positions for cooperation with the work in such fashion as to present it to the welding apparatus, and the welding heads are adjusted to the proper position for cooperation with the work. The proper adjustment of the brushes 55 having been made for the forming of a weld or welds of the desired length and the desired spacing between the welds, the feeding mechanism is operated to transmit the work past the welding apparatus, incident to which travel of the work the fusible electrode is maintained automatically in proper position relative to the work. In the operation which I have termed stitch welding, the work is fed continuously, but at different rates at different times. Through the regulation exercised by the automatic control mechanism, during the time a weld is being made, the work is fed at a speed appropriate for that operation, said rate depending, among other things, on the quantity of current employed for forming the weld and the rate at which the material to be welded may be heated to the welding temperature. During such time, however, as the work is being moved from one welding position to another, as for obtaining the desired spacing between welds, the feeding mechanism is operated at a speed much higher than that appropriate for the welding operation. Incident to the feeding of the work, the assembled pieces are maintained and presented to the welding apparatus in the relationship in which they are to be connected, and the operation of the welding apparatus is started and stopped in a properly timed relationship to the feed of the work, so that welds of the desired length are formed therein at the places and in the relationships desired. If all of the longitudinal lines of welds necessary to connect the pieces cannot be formed during one pass of the work through the machine, the portions on which the welds have been formed during such pass are permitted to cool, to avoid any likelihood of the member being warped, and the further necessary welds are then formed on one or more additional passes.

What I claim is:

1. A method of forming a metallic member which comprises supporting and guiding component pieces of the member in the relationship in which they are to be connected, feeding the pieces progressively, and applying welding arcs simultaneously to oppositely located marginal portions of one of the pieces at intervals in the course of the progressive movement thereof.

2. Apparatus for forming composite metallic members comprising, in combination, feed means for advancing the work progressively, driving means for actuating the feed means, guide means for maintaining component pieces of the work in assembled relationship, an arc welding device for operation on the work in the course of its travel, and control means rendered effective by operation of the driving means to vary the rate of feed and effect periodic operation of the welding device.

3. Apparatus for connecting metallic members comprising, in combination, feed mechanism for progressively advancing component pieces of the work in assembled relationship, driving means for actuating the feed mechanism an arc welding device for operation on the work in the course of its travel and control means under control of the driving means for varying the speed of the feed mechanism and starting and stopping the welding operation.

4. Apparatus for forming composite metallic members comprising, in combination, feed members for progressively advancing component pieces of the work in assembled relationship, an arc welding device for operation on the work in the course of its travel, change speed apparatus for varying the rate of feed of the work, and control means rendered effective by operation of the driving means for governing speed changes of the change speed mechanism and welding operation of the welding device.

5. Apparatus for fabricating metallic members comprising, in combination, feed means for imparting progressive movement to the work, an arc welding device to which the work is fed, guide means for directing the work to the welding device, change speed mechanism, and control means operably dependent on the feed means for controlling change speed operation of the change speed mechanism and current supply to the welding device.

6. Apparatus for connecting metallic members comprising, in combination, feed means for imparting progressive movement to the work, an arc welding device to which the work is fed, change speed mechanism for the feed means and control means for effecting speed changing operation of the change speed mechanism and stop and start operations of the welding device, said control means operating in timed relationship with the progressive movement of the work.

7. Apparatus for connecting metallic members comprising, in combination, feed means for imparting progressive movement to the work, an arc welding device to which the work is fed, change speed mechanism for the feed means, and control means for effecting intermittent operation of the change speed mechanism and welding device.

8. Apparatus for connecting metallic members comprising, in combination, feed means for imparting progressive movement to the work, an arc welding device to which the work is fed, change speed mechanism for the feed means, and control means timed with the work feed for effecting intermittent operation of the change speed mechanism and welding device.

9. Apparatus for connecting metallic members comprising, in combination, feed means for imparting progressive movement to the work, an arc welding device to which the work is fed, drive means for operating the feed means continuously, change speed mechanism for varying the speed of the feed means, and control means timed with the feed means for effecting periodic operation of the change speed mechanism and welding device.

10. In a welding machine, the combination with a conveyor for transmitting progressively the member to be welded, of an arc welding head mounted for operation on said members during progressive movement thereof by the conveyor, a switch device operating in timed relationship with the conveyor, and means under control of the switch device for stopping and starting energization of the welding head during progressive movement of said members.

11. Apparatus for connecting metallic members comprising, in combination, an arc welding device, feed means for moving the work in operative association with the welding device, change speed mechanism for the feed means, and control mechanism operated automatically in timed relationship with the movement of the work for effecting periodic operation of the change speed mechanism and welding device.

12. Apparatus for connecting metallic members comprising, in combination, an arc welding device, feed means for feeding the work in operative association with the welding device, means for actuating the feed means with alternate periods of high and low speeds, and timing means operated automatically to synchronize the operation of the welding device with the low speed periods.

13. In a welding machine, in combination, an arc welding device, feed means for feeding the work in operative association with the welding device, a switch device operating automatically in timed relationship with the movement of the work, and means controlled by the switch device for effecting periodic operation of the welding device.

14. In a welding machine, in combination, a bed of rollers for supporting the work, an arc welding head arranged to operate on work transmitted on said bed, guide means arranged to guide the work in operative association with the welding head, means for rotating the rollers with alternate periods of high and low speed to transmit the work past the welding head, and means synchronized with the rollers for controlling the arcing of the welding head.

In testimony whereof I have hereunto subscribed my name this 2d day of May, A. D., 1927.

GEORGE A. CALDWELL.